United States Patent [19]

VanBreemen

[11] 4,452,509

[45] Jun. 5, 1984

[54] PROJECTION TELEVISION SCREEN HAVING A SELECTED AUDIENCE ENVELOPE

[75] Inventor: Bertram VanBreemen, Indianapolis, Ind.

[73] Assignee: RCA Corporation, New York, N.Y.

[21] Appl. No.: 372,810

[22] Filed: Apr. 28, 1982

[51] Int. Cl.³ .............................................. G03B 21/60
[52] U.S. Cl. ..................................................... 350/128
[58] Field of Search .................... 350/128; 353/37, 50, 353/69, 102

[56] References Cited

U.S. PATENT DOCUMENTS

| | | | |
|---|---|---|---|
| 2,589,014 | 3/1952 | McLeod | 350/128 |
| 2,934,998 | 5/1960 | Beard | 350/117 |
| 4,076,384 | 2/1978 | Deml et al. | 350/122 |
| 4,206,969 | 6/1980 | Cobb et al. | 350/126 |
| 4,374,609 | 2/1983 | Lange | 350/128 |

FOREIGN PATENT DOCUMENTS

| | | | |
|---|---|---|---|
| 2320762 | 4/1973 | Fed. Rep. of Germany | 350/128 |
| 2755293 | 7/1978 | Fed. Rep. of Germany | 350/128 |
| 2111715 | 7/1983 | United Kingdom . | |

*Primary Examiner*—Richard A. Wintercorn
*Attorney, Agent, or Firm*—Paul J. Rasmussen; William H. Meise; Scott J. Stevens

[57] ABSTRACT

A screen for a rear projection television receiver comprises a circular Fresnel lens element and a lenticular lens array. In order to adjust the location of the vertical audience envelope to optimize screen brightness for different viewing positions, the center of the Fresnel lens is displaced with respect to the center of the viewing screen. The principal light rays passing through the Fresnel lens are bent with respect to the lenticular array, thereby angling the vertical audience envelope with respect to the screen.

9 Claims, 5 Drawing Figures

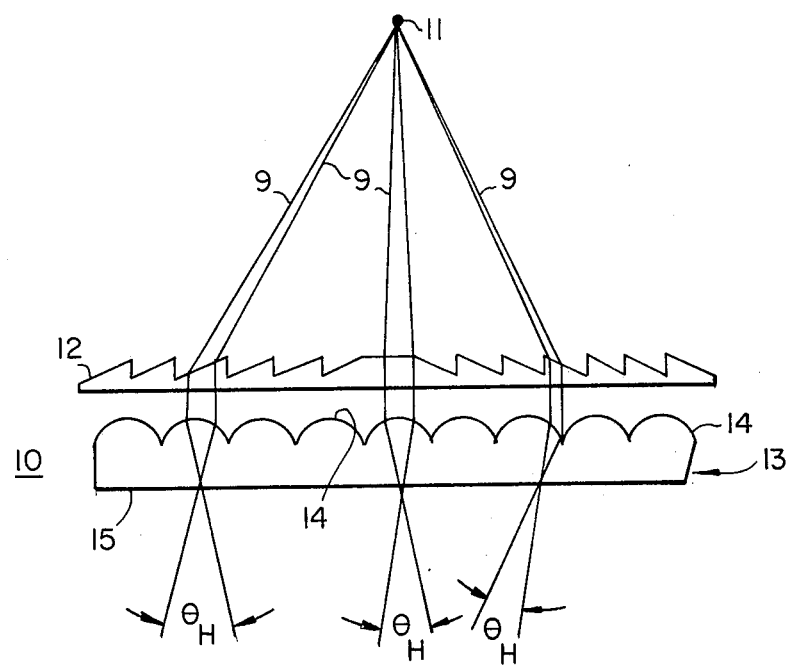
Fig.1
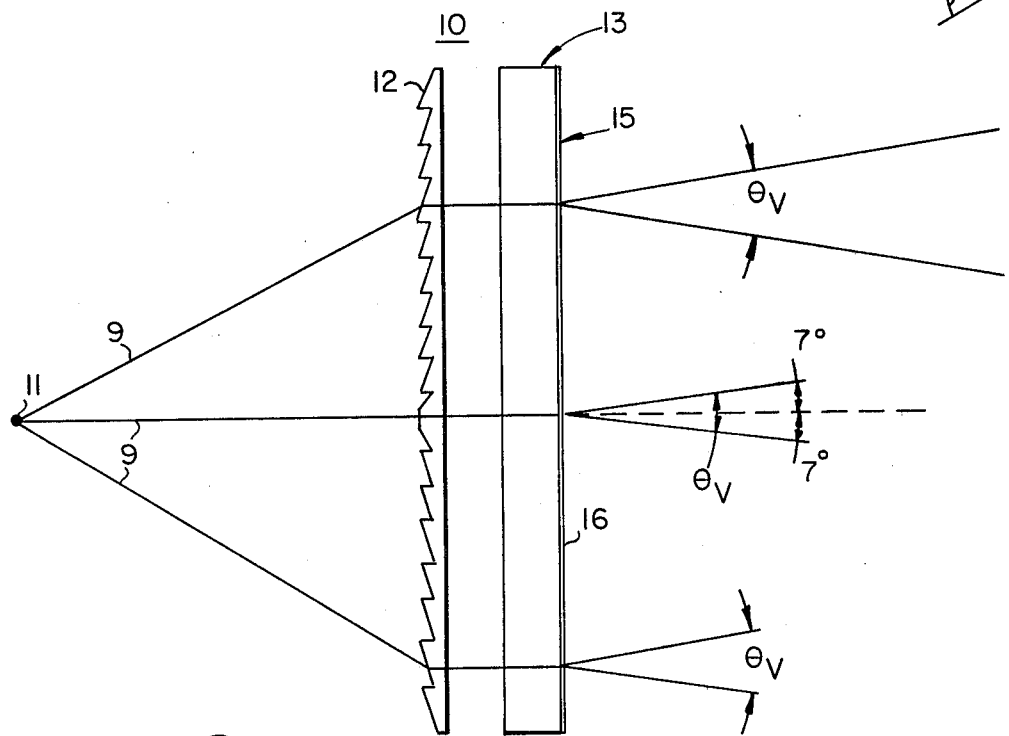
Fig.2          PRIOR ART

PROJECTION TELEVISION SCREEN HAVING A SELECTED AUDIENCE ENVELOPE

BACKGROUND OF THE INVENTION

This invention relates to projection screens for rear projection television receivers and in particular, to screens having a plurality of lens element layers.

Rear projection television receivers are made up of one or more display tubes or kinescopes, a lens and reflecting mirror arrangement, and a translucent screen which forms an enlarged image of the kinescope display screens. The images from the kinescopes are projected onto the rear of the screen, permitting the entire projection television structure to be enclosed in a single closed cabinet.

A representative rear projection television screen comprises a circular Fresnel lens which substantially collimates the light from the kinescope display screens. A lenticular lens array, composed of many vertically oriented lenticular lenses, focuses the light rays from the Fresnel lens onto an image plane, which may be part of the lenticular array. The lenticular lenses control the horizontal dispersion angle, which defines the horizontal audience envelope. A diffusion layer, which may be a coating on one surface of the lenticular lens array, provides a vertical dispersion angle defining a vertical audience envelope. The audience envelope is defined as the angle between light rays which are 3 dB down from the maximum ray, e.g., rays having 50% brightness as compared to the maximum brightness ray.

The vertical audience envelope provided by the diffusion layer is of the order of 15°. The most desirable viewing position therefore requires that the viewer's eye level be substantially in line with the principal ray axis, which is ordinarily coincident with the center of the screen. This position may be difficult for viewers to achieve in some installations, such as when the receiver is positioned above the viewers so that a large number of people may watch a single screen.

It is also desirable to provide a compact, low profile receiver for home use in order to minimize the disruption of room decor. Such a low profile projection television receiver results in the principal ray axis of the projection screen originating substantially below the eye level of a normal viewer, so that many viewers will be out of the desired audience envelope.

Several solutions to this problem exist. The entire projector mechanism including the screen may be tilted back. This, however, subjects the screen to reflections from overhead lights. Leaving the screen vertical while tilting the remaining projector mechanism will also change the angle of the principal light ray, but this arrangement introduces undesirable keystone distortion in the scanned rasters.

A special diffuser may be used to introduce an upwardly biased diffusion component. This, however, requires an additional screen element in the screen assembly. A prism component may also be built into the screen assembly to provide a bias to the light rays. Although this does not require an additional screen element, the existing elements become more complex and expensive.

SUMMARY OF THE INVENTION

The present invention is directed to a rear projection television screen having a vertical audience envelope which is assymetrical about the screen center which provides maximum screen brightness to viewers at angles away from the enter of the screen.

In accordance with the invention, there is provided a screen for a rear projection television receiver for projecting an image originating on one side of the screen to a viewer on the other side of the screen. The screen comprises a field lens which substantially collimates the light from the originating image. A focusing lens focuses the light from the field lens to form a viewable image on an image surface of the screen. Diffusion means located adjacent to the focusing lens form a vertical audience envelope. The principal ray of the field lens passes through the image surface at a point which is vertically displaced from the center point of the image surface. The audience envelope is therefore vertically assymetrical about a plane normal to the image surface at the center point.

BRIEF DESCRIPTION OF THE DRAWING

In the accompanying drawing,

FIG. 1 is a top cross-sectional view of a portion of a rear projection television screen, illustrating the paths of representative light rays;

FIG. 2 is a side elevational cross-sectional view of a prior art rear projection television screen, illustrating the paths of representative light rays;

DETAILED DESCRIPTION

Figure 3:
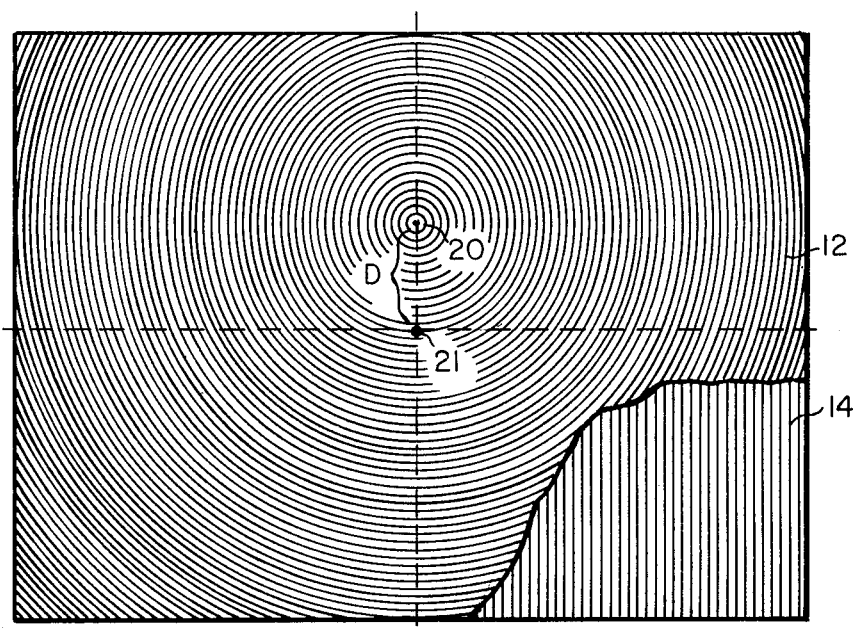
FIG. 3 is a rear elevational view of a rear projection television screen, shown partially broken away, in accordance with the present invention.

A top view of a representative rear projection television screen 10 is shown in FIG. 1. Light rays 9 are shown originating from a point source 11 in order to simplify the explanation of the operation of the screen. The screen 10 comprises a Fresnel lens element 12, which operates as a field lens to substantially collimate the light from source 11. The collimated light rays then pass through a lenticular lens array 13 made of small vertically disposed lenticular lens elements 14. The lenticular lens array 13 focuses the light rays from Fresnel lens 12 onto an image surface 15, shown in FIG. 1 as a surface of lens array 13 opposite the lens elements 14. The construction of lenticular lens array 13 determines the amount of light dispersion that occurs from image surface 15. In this way lenticular lens array 13 defines an audience viewing envelope, with an envelope angle designated $\theta_H$, in the horizontal plane. The audience viewing envelope may be defined as the angle bounded by light rays having a brightness of 50% with respect to the principal light ray of the envelope. A typical horizontal audience envelope may extend 45° on each side of the screen centerline. The lenticular lens elements focus the incoming light onto specific regions of the image surface of the screen. The areas where light is not focused may therefore be darkened to increase the contrast of the projected image.

It is also possible to provide lenticular lens elements to form a vertical audience envelope also, but a less expensive, more common approach is the use of a diffusing layer or coating on the image surface side of the screen. This is shown as element 16 in FIG. 2. The diffusion layer may also be formed as a separate lens element and located, for example, between the Fresnel lens and the lenticular array. The arrangement illustrated in FIG. 2 diffuses the light slightly to form a vertical audience envelope having an envelope angle designated $\theta_V$. This audience envelope angle $\theta_V$ may be of the order of $\pm 7°$ from the screen centerline, as shown in FIG. 2. With a low profile projection television receiver, the eye level of a typical viewer 17 may be outside the audience envelope at an undesirable viewing position.

Figure 4:
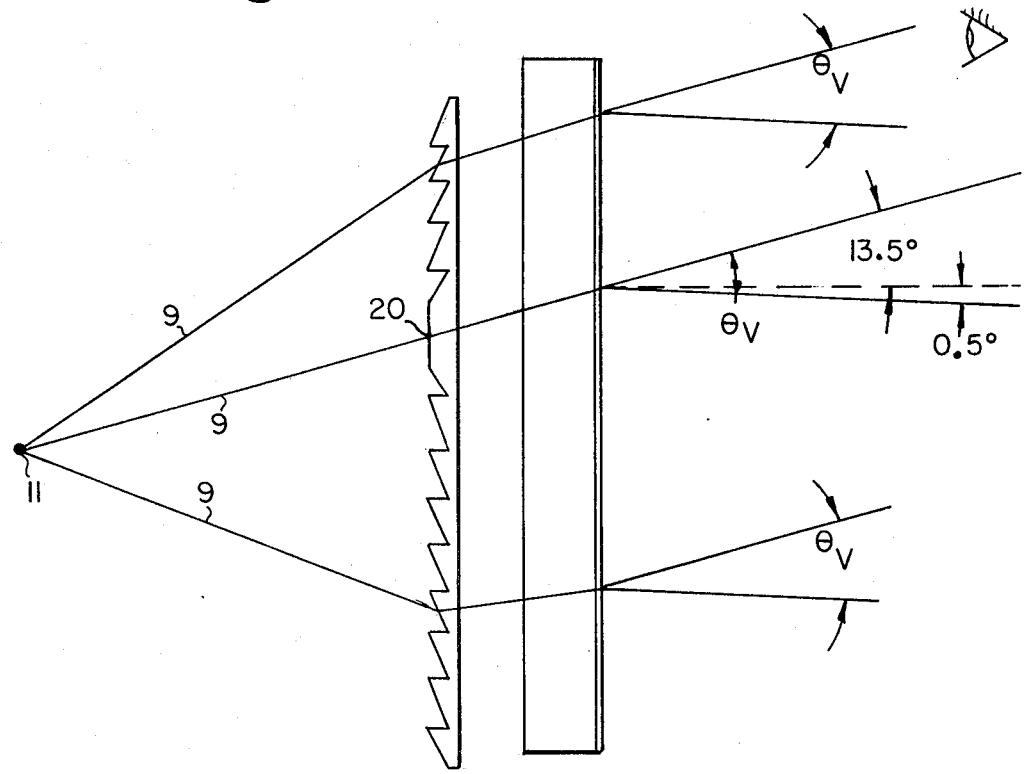
FIG. 4 is a side elevational cross-sectional view of the screen of FIG. 3, illustrating the paths of representative light rays.

FIG. 3 illustrates a rear projection television screen which changes the symmetry of the vertical audience envelope to permit placement of the projection television receiver in location which would otherwise result in undesirable viewing positions. The center 20 of the circular Fresnel lens 12 is not coincident with the center 21 of the screen image surface 15. In FIG. 3 the Fresnel center 20 is shown disposed above the screen center by a distance D. The vertically oriented lenticular lens elements 14 can also be seen in FIG. 3, with a portion of Fresnel lens 12 broken away. As can be seen in FIG. 4, displacement of the Fresnel center 20 with respect to the screen enter 21 results in a skewing of the principal light rays with respect to the lenticular array 13. This causes the vertical audience envelope to be angled upward so that the viewer 17 is located in a desirable viewing position. For example, for a rear projection screen having a diagonal dimension of 50 inches, a vertical displacement of the Fresnel center by approximately 6 inches results in a vertical audience envelope of $\theta_V$ of approximately 14° having a positive vertical angle of approximately 13.5° and a negative vertical angle of approximately $-0.5°$, as shown in FIG. 4.

It is of course possible to displace the Fresnel lens center downward with respect to the screen center in order to angle the vertical audience envelope down toward a viewer as may be desired if the projection receiver were to be mounted above the viewers, as may be the case in locations which broadcast closed circuit events to a large number of people. This may be accomplished by rotating a Fresnel lens such as is shown in FIG. 3 to displace the lens center 20 below the center of the screen or by constructing the Fresnel lens to be oversize so that a viewer could easily adjust its position to optimize the vertical envelope position for an individual viewing position.

Figure 5:
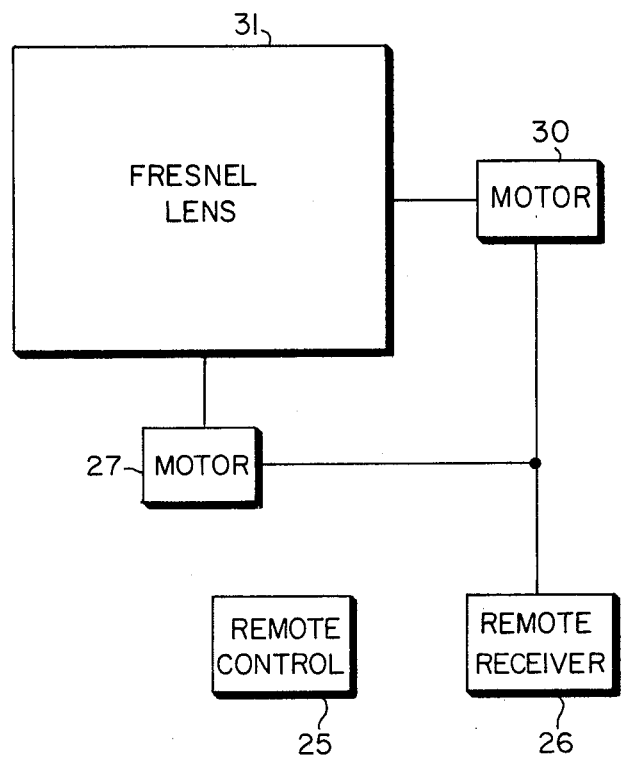
FIG. 5 is a block diagram of a screen adjustment scheme, using a remote control device.

This individual screen adjustment could be accomplished by moving the Fresnel lens by one or more motors controlled by a receiver mounted switch or by a remote control. In this way each viewer could easily adjust the position of the Fresnel lens to achieve maximum screen brightness for a particular position. FIG. 5 illustrates a scheme in which a remote control device 25 provides signals to a remote control signal receiving apparatus 26 on the television receiver which controls the operation of motors 27 and 30. Motors 27 and 30 are connected to a Fresnel lens element 31 of the projection screen and are positioned to move the Fresnel lens element 31 horizontally or vertically with respect to the other screen elements in order to adjust the viewing envelope for a given viewing position.

What is claimed is:

1. A screen for a rear projection television receiver for projecting an image originating from an image source on one side of said screen to a viewer on the other side of said screen, said screen comprising:

field lens means for substantially collimating the light from said image source;

focusing lens means for focusing the light from said field lens means for forming a viewable image on an image surface of said screen; and diffusion means located adjacent to said focusing lens means for forming a vertical audience envelope;

wherein said field lens is disposed with respect to said focusing lens such that the light ray that passes through the center of said field lens means forms a nonzero angle with respect to a horizontal plane aligned with the horizontal centerline of said image surface such that said vertical audience envelope is asymmetrical about said horizontal plane.

2. The arrangement defined in claim 1, wherein said light ray passes through said image surface at a point which is vertically displaced from said image surface centerline.

3. The arrangement defined in claim 2, wherein said audience envelope is vertically asymmetrical about said horizontal plane.

4. A screen for a rear projection television receiver comprising:

a focusing lens element incorporating an image surface for producing a visible image on said image surface, said image having a predetermined brightness within a vertical envelope;

a collimating lens element disposed between said focusing lens element and an image source and transversely displaced with respect to said focusing lens element such that a light ray that passes through the center of said collimating lens element forms a nonzero angle with respect to a horizontal plane normal to said image surface such that said vertical envelope is asymmetrical about said horizontal plane.

5. The arrangement defined in claim 4, wherein said focusing lens element comprises a lenticular lens array incorporating vertically oriented lenticular lens elements.

6. The arrangement defined in claim 4, wherein said collimating lens element comprises a circular Fresnel lens.

7. A screen for a rear projection television receiver comprising:

a focusing lens element, incorporating an image surface, for producing a visible image on said image surface, said image having a predetermined brightness within a vertical envelope angle;

a collimating lens element comprising a circular Fresnel lens disposed between said focusing lens element and an image source and transversely displaced with respect to said focusing lens element such that said vertical envelope angle is asymmetrical about a horizontal plane normal to said image surface, wherein the center of said circular Fresnel lens is vertically displaced with respect to the center of said image surface.

8. A screen for a rear projection television receiver comprising:

a focusing lens element, incorporating an image surface, for producing a visible image on said image surface, said image having a predetermined brightness within a vertical envelope angle;

a collimating lens element disposed between said focusing lens element and an image source and transversely displaced with respect to said focusing lens element such that said vertical envelope angle is asymmetrical about a horizontal plane normal to said image surface, wherein the transverse position of said collimating lens element with respect to said focusing lens element is adjustable to control the location of said vertical envelope angle.

9. The arrangement defined in claim 8, wherein the adjustment of said collimating lens element is controlled via a remote control device.

* * * * *